United States Patent
Yang et al.

(10) Patent No.: US 9,708,471 B2
(45) Date of Patent: Jul. 18, 2017

(54) FILLED POLYPROPYLENE COMPOSITIONS AND RELATED AUTOMOTIVE COMPONENTS

(71) Applicant: Equistar Chemicals, LP, Houston, TX (US)

(72) Inventors: Changlai Yang, Okemos, MI (US); Dongman Choi, Lansing, MI (US)

(73) Assignee: Equistar Chemicals, LP, Houston, TX (US)

( * ) Notice: Subject to any disclaimer, the term of this patent is extended or adjusted under 35 U.S.C. 154(b) by 137 days.

(21) Appl. No.: 14/452,040

(22) Filed: Aug. 5, 2014

(65) Prior Publication Data

US 2015/0045479 A1    Feb. 12, 2015

Related U.S. Application Data

(60) Provisional application No. 61/864,187, filed on Aug. 9, 2013.

(51) Int. Cl.
*C08L 1/02* (2006.01)
*C08L 23/12* (2006.01)
*C08L 23/14* (2006.01)

(52) U.S. Cl.
CPC ............ *C08L 1/02* (2013.01); *C08L 23/12* (2013.01); *C08L 23/14* (2013.01)

(58) Field of Classification Search
CPC ........................................................ C08L 1/02
See application file for complete search history.

(56) References Cited

U.S. PATENT DOCUMENTS

| | | | |
|---|---|---|---|
| 2006/0264543 A1 | 11/2006 | Lustiger et al. | |
| 2010/0190891 A1* | 7/2010 | Eichinger | C08L 1/00 524/35 |
| 2012/0108728 A1 | 5/2012 | Tranninger | |
| 2013/0203908 A1 | 8/2013 | Kock et al. | |

FOREIGN PATENT DOCUMENTS

| | | | | |
|---|---|---|---|---|
| AT | EP 2551299 A1 * | 1/2013 | | C08L 23/10 |
| EP | 1477525 A1 | 11/2004 | | |
| EP | 2551299 A1 | 1/2013 | | |
| WO | WO 2012025584 A1 | 3/2012 | | |

OTHER PUBLICATIONS

PCT International Search Report and Written Opinion for PCT/US2014/049972 mailed Nov. 18, 2014.

* cited by examiner

*Primary Examiner* — Lanee Reuther

(57) ABSTRACT

The present disclosure provides a filled composition made from and/or containing (A) a first polymer composition made from and/or containing (i) a heterophasic polypropylene copolymer and (ii) a polypropylene blend, and (B) a biofiller composition made from and/or containing a cellulose-based biofiller. The filled composition can additionally be made with and/or contain an elastomeric ethylene copolymer composition. Optionally, the filled composition can further be made with and/or contains a grafted polyolefin composition. The filled composition is useful in making automotive components.

17 Claims, No Drawings

FILLED POLYPROPYLENE COMPOSITIONS AND RELATED AUTOMOTIVE COMPONENTS

CROSS-REFERENCE TO RELATED APPLICATIONS

This application claims the priority and benefit of U.S. Provisional Patent Application No. 61/864,187, filed on Aug. 9, 2013, the content of which is incorporated herein by reference in its entirety.

FIELD OF THE INVENTION

In general, the present disclosure relates to the field of chemistry. More specifically, the present disclosure relates to polypropylene compositions. In particular, the polypropylene compositions are filled and useful in automotive components.

BACKGROUND OF THE INVENTION

Some automotive components are made from polypropylene-based compositions. Those automotive components include spare-wheel compartment covers, underbody panels, seat backrests, engine and transmission covers, rear panel shelves, and door trim panels.

Fillers such as talc are used in those compositions to provide a wide range of physical properties. As an alternative to talc, biofillers such as wood, flax, wheat straw, coconut, kenaf, and hemp have been compounded with polymers.

BRIEF SUMMARY OF THE INVENTION

In some embodiments, the present disclosure provides a filled composition made from and/or containing (A) a first polymer composition made from and/or containing (i) a heterophasic polypropylene copolymer and (ii) a polypropylene blend, and (B) a biofiller composition made from and/or containing a cellulose-based biofiller. In some embodiments, the filled composition is additionally made with and/or contains an elastomeric ethylene copolymer composition can be made from and/or contains an elastomeric ethylene copolymer. In other embodiments, the filled composition additionally is made with and/or contains a grafted polyolefin composition. The filled composition is useful in making automotive components.

In further embodiments, the present disclosure provides a filled composition made from and/or containing (A) from about 50 to about 95 weight percent of a first polymer composition, relative to the total weight of the filled composition, made from and/or containing (i) a heterophasic polypropylene copolymer and (ii) a polypropylene blend, and (B) from about 5 to about 50 weight percent a biofiller composition made from and/or containing of a cellulose-based biofiller, relative to the total weight of the filled composition.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "additives composition" refers to a composition made from and/or containing at least one additive.

In the present description, the term "α-olefin" or "alpha-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "biofiller composition" refers to a composition made from and/or containing at least one cellulose-based biofiller.

In the present description, the term "elastomer" refers to polymer compounds having rubber-like properties and crystallinity in the range of from about 0 percent to about 20 percent. The polymer can have crystallinity in the range of from about 0 percent to about 5 percent.

In the present description, the term "elastomeric ethylene copolymer composition" refers to a composition made from and/or containing at least one elastomeric ethylene copolymer.

In the present description, the term "grafted polyolefin" refers to a polyolefin grafted with an unsaturated monomer. The unsaturated monomer can be an unsaturated polar monomer. The unsaturated monomer can contain one or more oxygen atoms.

In the present description, the term "grafted polyolefin composition" refers to a composition made from and/or containing at least one grafted polyolefin.

In the present description, the term "heterophasic polypropylene copolymer" refers to copolymer prepared by the copolymerization of ethylene and propylene into a polypropylene matrix. The base polypropylene may be a homopolymer or a copolymer.

In the present description, the term "homopolymer" and similar terms mean a polymer consisting solely or essentially all of units derived from a single kind of monomer, e.g., ethylene homopolymer is a polymer comprising solely or essentially all of units derived from ethylene, propylene homopolymer is a polymer comprising solely or essentially all of units derived from propylene, and the like.

In the present description, the term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from and/or containing at least one polymer.

In the present description, the term "polyolefin" is used herein broadly to include polymers such as polyethylene, ethylene-alpha olefin copolymers (EAO), polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description, the term "room temperature" refers to a temperature around 25 degrees Celsius.

In the present description, the term "thermoplastic polymer" means a polymer that softens when exposed to heat and returns to its original condition when cooled to room temperature.

In the present description, the terms "Ziegler-Natta-catalyzed polymer" and "Z-N-catalyzed polymer" mean any polymer that is made in the presence of a Ziegler-Natta catalyst.

Testing

ASTM D 785 is entitled "Standard Test Method for Rockwell Hardness of Plastics and Electrical Insulating Materials." The term "ASTM D 785" as used herein refers to the test method covers two procedures for testing the indention hardness of plastics and related plastic electrical insulating materials by means of the Rockwell hardness tester. A Rockwell hardness number is a number derived from the net increase in depth impression as the load on an indenter is increased from a fixed minor load to a major load and then returned to a minor load (Procedure A). A Rockwell alpha ($\alpha$) hardness number represents the maximum possible remaining travel of a short-stroke machine from the net depth of impression, as the load on the indenter is increased from a fixed minor load to a major load (Procedure B). Indenters are round steel balls of specific diameters. Rockwell hardness numbers are always quoted with a scale symbol representing the indenter size, load, and dial scale used. Procedure A yields the indentation of the specimen remaining 15 s after a given major load is released to a standard 10-kg minor load. Procedure B yields the indentation of the indenter into the specimen after a 15-s application of the major load while the load is still applied. This test method was approved in 2008, the contents of which are incorporated herein by reference in its entirety. For the referenced ASTM standards, visit the ASTM website, www.astm.org, or contact ASTM Customer Service at service@astm.org.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

ISO 75 is entitled "Determination of Temperature of Deflection under Load." The term "ISO 75" as used herein refers to the test methods for the determination of the temperature of deflection under load (flexural stress under three-point loading) of plastics. Different types of test specimen and different constant loads are defined to suit different types of material. ISO 75-2 gives specific requirements for plastics (including filled plastics and fibre-reinforced plastics in which the fiber length, prior to processing, is up to 7.5 mm) and ebonite, while ISO 75-3 gives specific requirements for high-strength thermosetting laminates and long-fiber-reinforced plastics in which the fiber length is greater than 7.5 mm. The methods specified are for assessing the relative behavior of different types of material at elevated temperature under load at a specified rate of temperature increase. The results obtained do not necessarily represent maximum applicable temperatures because in practice essential factors, such as time, loading conditions and nominal surface stress, can differ from the test conditions. True comparability of data can be achieved for materials having the same room-temperature flexural modulus.

ISO 178 is entitled "Plastics—Determination of Flexural Properties." The term "ISO 178" as used herein refers to the standard test method for testing the flexural properties of a material. In particular, the flexural test measures the force required to bend a beam under three point loading conditions. The data can be used to select materials for parts that will support loads without flexing. Flexural modulus is used as an indication of a material's stiffness when flexed. Since the physical properties of many materials can vary depending on ambient temperature, it is sometimes appropriate to test materials at temperatures that simulate the intended end use environment. The specimen can lie on a support span and the load is applied to the center by the loading nose producing three point bending at a specified rate. The parameters for this test are the support span, the speed of the loading, and the maximum deflection for the test. These parameters are based on the test specimen thickness and are defined differently by ASTM and ISO standards. For ASTM D 790, the test is stopped when the specimen reaches 5% deflection or the specimen breaks before 5%. For ISO 178, the test is stopped when the specimen breaks. Of the specimen does not break, the test is continued as far as possible and the stress at 3.5% (conventional deflection) is reported. A variety of specimen shapes can be used for this test, including the specimen size for ASTM of 3.2 mm×12.7 mm×125 mm (0.125"×0.5"×5.0") and for ISO of 10 mm×4 mm×80 mm. By using the flexural text, the following data may be obtained: flexural stress at yield, flexural strain at yield, flexural stress at break, flexural strain at break, flexural stress at 3.5% (ISO) or 5.0% (ASTM) deflection, and flexural modulus.

ISO 180 is entitled "Determination of Izod Impact Strength." The term "ISO 180" as used herein refers to the test method for determining the Izod impact strength of plastics under defined conditions. A number of different types of specimen and test configurations are defined. Different test parameters are specified according to the type of material, the type of test specimen and the type of notch.

ISO 527 is entitled "Plastics—Determination of Tensile Properties." The term "ISO 527" as used herein refers to the test methods for determining the tensile properties of plastics and plastic composites under defined conditions. Several different types of test specimen are defined to suit different types of material. The methods are used to investigate the tensile behavior of the test specimens and for determining the tensile strength, tensile modulus and other aspects of the tensile stress/strain relationship under the conditions defined.

ISO 1183 is entitled "Methods for Determining the Density of Non-Cellular Plastics." The term "ISO 1183" as used herein refers to the test method for the determination of the density of non-cellular molded or extruded plastics in void-free form. In this gradient column method, density gradient columns are containing a mixture of two liquids, the density in the column increasing uniformly from top to bottom.

Incorporated Unsaturated Monomer (Weight Percent): The amount of the unsaturated monomer incorporated into the grafted polyolefin can be measured by wet chemical methods (titration, etc.) or Fourier transform infrared spectroscopy (FTIR).

"Molecular Weight Distribution (Mw/Mn)" is measured by gel permeation chromatography. MWD and the ratio $M_w/M_n$ are determined using a Waters 150-C ALC/Gel Permeation Chromatography (GPC) system equipped with a TSK column set (type GMHXL-HT) working at 135 degrees Celsius with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140 degrees Celsius for 1 hour. The solution is filtered through a 0.45 µm Teflon membrane. The filtrate (concentration 0.08-1.2 g/l injection volume 300 µl) is subjected to GPC. Monodisperse fractions of polystyrene (provided by Polymer Laboratories) are used as standard.

Xylene Solubles for Polymers (percent by weight): 2.5 g of polymer are dissolved in 250 ml of xylene, at 135 degrees Celsius, under agitation. After 20 minutes, the solution is cooled to 0 degrees Celsius under stirring, and then it is allowed to settle for 30 minutes. The precipitate is filtered with filter paper; the solution is evaporated under a nitrogen current, and the residue dried under vacuum at 140 degrees Celsius until constant weight. The weight percentage of polymer soluble in xylene at 0 degrees Celsius is then calculated. The percent by weight of polymer insoluble in xylene at room temperature is considered the isotactic index of the polymer.

In a general embodiment, the present disclosure provides a filled composition made from and/or containing:
(A) a first polymer composition, and
(B) a biofiller composition.

In a general embodiment, the present disclosure provides a filled composition made from and/or containing:
(A) a first polymer composition made from and/or containing
  (i) a heterophasic polypropylene copolymer and
  (ii) a polypropylene blend, and
(B) a biofiller composition made from and/or containing a cellulose-based biofiller.

In a general embodiment, the present disclosure provides a filled composition made from and/or containing:
(A) a first polymer composition made from and/or containing
  (i) a first heterophasic polypropylene copolymer,
  (ii) a polypropylene blend selected from the group consisting of:
    (a) a first polymer blend made from and/or containing
      (1) a second heterophasic polypropylene copolymer and
      (2) a third heterophasic polypropylene copolymer,
    (b) a second polymer blend made from and/or containing
      (1) the second heterophasic polypropylene copolymer and
      (2) a first homopolymer polypropylene,
    (c) a third polymer blend made from and/or containing
      (1) a second homopolymer polypropylene and
      (2) a third homopolymer polypropylene,
(B) a biofiller composition made from and/or containing a cellulose-based biofiller.

In an embodiment, heterophasic polypropylene copolymers for use as the first heterophasic polypropylene copolymer have a melt flow rate in the range of about 10 grams per 10 minutes to about 40 grams per 10 minutes. The first heterophasic polypropylene copolymer can have a melt flow rate in the range of about 15 grams per 10 minutes to about 25 grams per 10 minutes. In some embodiments, the first heterophasic polypropylene copolymer will have a melt flow rate of 15, 16, 17, 18, 19, 20, 21, 22, 23, 24, or 25 grams per 10 minutes.

In an embodiment, heterophasic polypropylene copolymers for use as the first heterophasic polypropylene copolymer can have a Percent Xylene Solubles in the range of about 10 weight percent to about 40 weight percent weight percent, based on the total weight of the heterophasic polypropylene copolymer. The first heterophasic polypropylene copolymer can have a Percent Xylene Solubles in the range of about 15 weight percent to about 30 weight percent weight percent, based on the total weight of the heterophasic polypropylene copolymer.

The heterophasic copolymer can be prepared by sequential polymerization in at least two stages and in the presence of Ziegler-Natta catalyst supported on a magnesium halide in active form.

The polymerization process, which can be continuous or batch, is carried out in liquid phase, in the presence or not of inert diluent, or in gas phase, or by mixed liquid-gas techniques.

The stereospecific polymerization catalysts comprise the product of the reaction between: 1) a solid component, containing a titanium compound and an electron-donor compound (internal donor) supported on magnesium dihalide; 2) an aluminum alkyl compound (cocatalyst); and, optionally, 3) an electron-donor compound (external donor).

In an embodiment, the second heterophasic polypropylene copolymers for use in making the polymer blend can have a melt flow rate in the range of about 50 grams per 10 minutes to about 200 grams per 10 minutes. The second heterophasic polypropylene copolymer can have a melt flow rate in the range of about 80 grams per 10 minutes to about 150 grams per 10 minutes. In some embodiments, the melt flow rate will be in the range of from about 100 grams per 10 minutes to about 120 grams per 10 minutes.

In an embodiment, the second heterophasic polypropylene copolymers for use in making the polymer blend can have a Percent Xylene Solubles in the range of about 5 weight percent to about 20 weight percent weight percent, based on the total weight of the heterophasic polypropylene copolymer. The second heterophasic polypropylene copolymer can have a Percent Xylene Solubles in the range of about 5 weight percent to about 15 weight percent weight percent, based on the total weight of the heterophasic polypropylene copolymer. In some embodiments, the second heterophasic polypropylene copolymer will have a Percent Xylene Solubles of 5, 6, 7, 8, 9, 10, 11, 12, 13, 14, or 15 weight percent weight percent, based on the total weight of the heterophasic polypropylene copolymer.

In some embodiments, the third heterophasic polypropylene copolymers for use in making the polymer blend can have a melt flow rate in the range of about 0.5 grams per 10 minutes to about 10 grams per 10 minutes. The third heterophasic polypropylene copolymer can have a melt flow rate in the range of about 1 grams per 10 minutes to about 5 grams per 10 minutes. In some embodiments, the third heterophasic polypropylene copolymer will have a melt flow rate of 1, 2, 3, 4, or 5 grams per 10 minutes.

In an embodiment, the third heterophasic polypropylene copolymers for use in making the polymer blend can have a Percent Xylene Solubles in the range of about 5 weight percent to about 20 weight percent, based on the total weight of the heterophasic polypropylene copolymer. The third heterophasic polypropylene copolymer can have a Percent Xylene Solubles in the range of about 5 weight percent to about 15 weight percent weight percent, based on the total weight of the heterophasic polypropylene copolymer. In some embodiments, the third heterophasic polypropylene copolymer will have a Percent Xylene Solubles of 5, 6, 7, 8, 9, 10, 11, 12, 13, 14, or weight percent weight percent, based on the total weight of the heterophasic polypropylene copolymer.

Such heterophasic copolymers are commercially available as HIFAX™ (LyondellBasell) and PROFAX™ (LyondellBasell) polypropylene.

In some embodiments, the first homopolymer polypropylene for use in making the polymer blend have a melt flow rate in the range of about 1000 grams per 10 minutes to about 3000 grams per 10 minutes. The first homopolymer polypropylene can have a melt flow rate in the range of about 1500 grams per 10 minutes to about 2000 grams per 10 minutes.

In some embodiments, the second homopolymer polypropylene for use in making the polymer blend have a melt flow rate in the range of about 0.5 grams per 10 minutes to about 30 grams per 10 minutes. The second homopolymer polypropylene can have a melt flow rate in the range of about 1 grams per 10 minutes to about 5 grams per 10 minutes. In some embodiments, the second homopolymer polypropylene will have a melt flow rate of 1, 2, 3, 4, or 5 grams per 10 minutes.

In some embodiments, the third homopolymer polypropylene for use in making the polymer blend have a melt flow rate in the range of about 50 grams per 10 minutes to about 150 grams per 10 minutes. The third homopolymer polypropylene can have a melt flow rate in the range of about 50 grams per 10 minutes to about 100 grams per 10 minutes. In some embodiments, the melt flow rate will be in the range of from about 60 grams per 10 minutes to about 70 grams per 10 minutes.

Such homopolymer polypropylenes are commercially available as ADSTIF™ (LyondellBasell), METOCENE™ (LyondellBasell), and PROFAX™ (LyondellBasell) polymers.

The biofiller composition can be made from and/or contain a cellulose-based biofiller. Examples of cellulose-based biofillers include wood-based biofillers.

The biofiller can be added as a neat filler or as part of a masterbatch. In some embodiments, the filled composition can have the biofiller present in an amount in the range from about 5 to about 50 weight percent, based upon the total weight of the filled composition. In other embodiments, the filled composition can have the biofiller present in an amount in the range from about 5 to about 40 weight percent, based upon the total weight of the filled composition. In some other embodiments, the filled composition can have the biofiller present in an amount in the range from about 10 to about 30 weight percent.

The masterbatch can be made from and/or contain the cellulose fiber and a virgin polymer. In some embodiments, the weight percent of cellulose fiber in a masterbatch can be in the range of about 10 weight percent to about 90 weight percent, based on the total weight of the masterbatch. In other embodiments, the wood-based biofillers will have a weight percent of cellulose fiber present in a weight percent from about 40 to about 90. In yet other embodiments, the wood-based biofillers will have a weight percent of cellulose fiber present in a weight percent from about 50 to about 80.

In another embodiment, the biofiller composition is additionally made with and/or contains an inorganic filler. Inorganic fillers include talc.

In another embodiment, the filled composition additionally is made with and/or contains an additives composition having one or more additives.

Exemplary additives include colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components. Such additives can be used in conventional amounts. In some embodiments, the amounts do not exceed 10 weight percent of the total composition.

In some embodiments, the filled composition is additionally made with and/or contains an elastomeric ethylene copolymer composition can be made from and/or contains an elastomeric ethylene copolymer. Examples of elastomeric ethylene copolymer include ethylene/alpha-olefin copolymers with at least one $C_3$ to $C_{10}$ alpha-olefin comonomer, and optionally, a polyene comonomer. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. The elastomeric ethylene copolymer can be an ethylene/alpha-olefin copolymers with (a) ethylene-derived units and (b) alpha-olefin comonomer units derived from at least one comonomer selected from the group consisting of $C_3$ to $C_{10}$ alpha-olefins. In some embodiments, the elastomeric ethylene copolymer is an ethylene/octene copolymer. In other embodiments, the ethylene/octene copolymer has a melt index from about 0.2 to about 6.0 grams per 10 minutes and a density from about 0.850 to about 0.900 grams per cubic centimeter.

Exemplary elastomeric ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene, and ethylene/1,3,5-hexatriene. Exemplary elastomeric ethylene terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene, and ethylene/propylene/1,3,5-hexatriene. Exemplary elastomeric ethylene tetrapolymers include ethylene/propylene/1-octene/diene, ethylene/butene/1-octene/diene, and ethylene/propylene/mixed dienes.

Such elastomeric ethylene copolymers are commercially available as ENGAGE™ (The Dow Chemical Company), EXACT™ (ExxonMobil Chemical Company), or TAFMER™ (Mitsui Chemical) polymers.

In another embodiment, the filled composition additionally is made with and/or contains a grafted polyolefin composition. The grafted polyolefin composition is made from and/or containing a polypropylene polymer grafted with an unsaturated monomer.

In some embodiments, grafted polyolefins for use in making the grafted polyolefin composition are prepared by reacting polyolefins with unsaturated monomers at elevated temperatures, with or without a free-radical initiator, to graft unsaturated monomer units onto the polyolefin backbone. The grafting reaction can occur under an inert gas, such as nitrogen.

Polyolefins for making the grafted polyolefins can include polypropylenes, ethylene-propylene copolymers, impact-modified polypropylenes, and the like, and blends thereof.

Unsaturated monomers can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Other unsaturated monomers are described in U.S. Pat. No. 6,385,777 and U.S. Patent Application Publication No. 2007/0054142, the teachings of which are incorporated herein by reference.

The relative amounts of polyolefin and unsaturated monomer used will vary and depend on factors such as the nature of the polyolefin and the unsaturated monomer, the desired tie-layer properties, the reaction conditions, the available equipment, and other factors. In some embodiments, the unsaturated monomer is used in an amount within the range of about 0.1 to about 15 weight percent, based on the total weight of the grafted polyolefin. The unsaturated monomer can be in the range of from about 0.5 to about 6 weight percent. In some embodiments, the range can be from about 1 to about 3 weight percent.

Grafting of the unsaturated monomer(s) to the polyolefin can be accomplished by heating a mixture of the unsaturated monomer(s) and the polyolefin. The grafted polyolefin can be prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are useful for performing the grafting step. A free-radical initiator such as an organic peroxide can be employed.

Grafting of the unsaturated monomer to the polyolefin is performed at elevated temperatures. Shear rates in the extruder can vary over a wide range.

The grafted polyolefin composition can be present in an amount from about 0.5 to about 5 weight percent, relative to the total weight of the filled composition. In some embodiments, the grafted polyolefin composition is present in an amount from about 1 to about 5 weight percent. In other embodiments, the grafted polyolefin is present in 1, 2, 3, 4, or 5 weight percent, relative to the total weight of the filled composition.

In another embodiment, heterophasic polypropylene copolymers for use as the first heterophasic polypropylene copolymer have a melt flow rate in the range of about 50 grams per 10 minutes to about 200 grams per 10 minutes. The first heterophasic polypropylene copolymer can have a melt flow rate in the range of about 80 grams per 10 minutes to about 150 grams per 10 minutes. In some embodiments, the melt flow rate will be in the range of from about 100 grams per 10 minutes to about 120 grams per 10 minutes.

In some embodiments, the present disclosure provides a filled composition having a melt flow rate (ASTM D1238) in the range of about 3 grams per 10 minutes to about 20 grams per 10 minutes. In other embodiments, the filled composition can have a melt flow rate in the range of about 5 to about 10 grams per 10 minutes. In some embodiments, the filled composition can have a melt flow rate of 5, 6, 7, 8, 9, or 10 grams per 10 minutes.

In some embodiments, the present disclosure provides a filled composition having a density (ISO 1183) in the range of about 0.920 grams per cubic centimeter to about 1.070 grams per cubic centimeter. In other embodiments, the filled composition can have a density in the range of about 0.950 grams per cubic centimeter to about 1.000 grams per cubic centimeter. In some embodiments, the filled composition can have a density of 0.950, 0.960, 0.970, 0.980, 0.990, or 1.00 grams per cubic centimeter.

In some embodiments, the present disclosure provides a filled composition having a tensile strength, 50 mm/min (ISO 527) in the range of about 20 MPa to about 40 MPa. In other embodiments, the filled composition can have a tensile strength in the range of about 25 to about 35 MPa. In some embodiments, the filled composition can have a tensile strength of 25, 26, 27, 28, 29, 30, 31, 32, 33, 34, or 35 MPa.

In some embodiments, the present disclosure provides a filled composition having an elongation-at-break, 50 mm/min (ISO 527) in the range of about 3 percent to about 60 percent. In other embodiments, the filled composition can have an elongation-at-break in the range of about 5 percent to about 30 percent.

In some embodiments, the present disclosure provides a filled composition having a flexural modulus, 2 mm/min (ISO 178) in the range of about 1300 MPa to about 3000 MPa. In some embodiments, the filled composition can have a flexural modulus in the range of about 1500 to about 2500 MPa.

In some embodiments, the present disclosure provides a filled composition having an Izod Impact at 23 degrees Celsius (ISO 180) in the range of about 2 kJ/m$^2$ to about 20 kJ/m$^2$. In other embodiments, the filled composition can have an Izod Impact at 23 degrees Celsius in the range of about 3 to about 10 kJ/m$^2$.

In some embodiments, the present disclosure provides a filled composition having an Izod Impact at −10 degrees Celsius (ISO 180) in the range of about 1 kJ/m$^2$ to about 10 kJ/m$^2$. In other embodiments, the filled composition can have an Izod Impact at −10 degrees Celsius in the range of about 2 to about 7 kJ/m$^2$. In yet other embodiments, the filled composition can have an Izod Impact at −10 degrees Celsius of about 2, 3, 4, 5, 6, or 7 kJ/m$^2$.

In some embodiments, the present disclosure provides a filled composition having an Izod Impact at −30 degrees Celsius (ISO 180) in the range of about 1 kJ/m$^2$ to about 6 kJ/m$^2$. In other embodiments, the filled composition can have an Izod Impact at −30 degrees Celsius in the range of about 2 to about 4 kJ/m$^2$.

In some embodiments, the present disclosure provides a filled composition having an HDT at 0.45 MPa (ISO 75) in the range of about 90 degrees Celsius to about 150 degrees Celsius. In other embodiments, the filled composition can have an HDT at 0.45 MPa in the range of about 100 to about 140 degrees Celsius.

In some embodiments, the present disclosure provides a filled composition having a Rockwell Hardness (ASTM D785) on the R-Scale in the range of about 70 to about 100. In other embodiments, the filled composition can have a Rockwell Hardness on the R-Scale in the range of about 80 to about 100.

In a general embodiment, the present disclosure provides a filled composition made from and/or containing:
(A) from about 50 to about 95 weight percent of a first polymer composition, relative to the total weight of the filled composition, made from and/or containing
  (i) from about 5 to about 35 weight percent of a first heterophasic polypropylene copolymer, relative to the total weight of the filled composition,
  (ii) from about 15 to about 70 weight percent of a polypropylene blend, relative to the total weight of the filled composition, and
(B) from about 5 to about 50 weight percent of a biofiller composition made from and/or containing a cellulose-based biofiller, relative to the total weight of the filled composition.

In some embodiments, the first heterophasic polypropylene copolymer is present in an amount from about 10 to about 30 weight percent, relative to the total weight of the filled composition. In other embodiments, the first heterophasic polypropylene copolymer is present in an amount from about 15 to about 25 weight percent. In other embodiments, the first heterophasic polypropylene copolymer is present in 15, 16, 17, 18, 19, 20, 21, 22, 23, 24, or 25 weight percent, relative to the total weight of the filled composition.

In some embodiments, the polypropylene blend is present in an amount from about 20 to about 60 weight percent, relative to the total weight of the filled composition. In other embodiments, the polypropylene blend is present in an amount from about 20 to about 50 weight percent. In other embodiments, the polypropylene blend is present in an amount from about 20 to about 45 weight percent.

In some embodiments, the biofiller composition is present in an amount from about 10 to about 30 weight percent, relative to the total weight of the filled composition.

In some embodiments, the filled composition is additionally made with and/or contains an elastomeric ethylene copolymer composition, which is present in an amount from about 5 to about 20 weight percent, relative to the total weight of the filled composition. In other embodiments, the elastomeric ethylene copolymer composition is present in an amount from about 10 to about 15 weight percent. In some embodiments, the elastomeric ethylene copolymer composition is present in 10, 11, 12, 13, 14, or 15 weight percent, relative to the total weight of the filled composition.

In some embodiments, the filled composition is additionally made with and/or contains a grafted polyolefin composition, which is present in an amount from about 0.5 to about 5 weight percent, relative to the total weight of the filled composition. In some embodiments, the grafted polyolefin composition is present in an amount from about 1 to about 5 weight percent. In other embodiments, the grafted polyolefin is present in 1, 2, 3, 4, or 5 weight percent, relative to the total weight of the filled composition.

In a general embodiment, the present disclosure provides an automotive component made from and/or containing:
(A) a first polymer composition made from and/or containing
  (i) a first heterophasic polypropylene copolymer,
  (ii) a polypropylene blend selected from the group consisting of:
    (a) a first polymer blend made from and/or containing
      (1) a second heterophasic polypropylene copolymer and
      (2) a third heterophasic polypropylene copolymer,
    (b) a second polymer blend made from and/or containing
      (1) the second heterophasic polypropylene copolymer and
      (2) a first homopolymer polypropylene, (c) a third polymer blend made from and/or containing
   (1) a second homopolymer polypropylene and
   (2) a third homopolymer polypropylene, and
(B) a biofiller composition made from and/or containing a cellulose-based biofiller.

In some embodiments, the automotive component is additionally made with and/or contains an elastomeric ethylene copolymer composition can be made from and/or contains an elastomeric ethylene copolymer.

In some embodiments, the automotive component additionally is made with and/or contains a grafted polyolefin composition. The grafted polyolefin composition is made from and/or containing a polypropylene polymer grafted with an unsaturated monomer.

EXAMPLES

The following examples are included to demonstrate embodiments of the invention. It should be appreciated by those of skill in the art that the techniques disclosed in the examples which follow represent techniques discovered by the inventor to function well in the practice of the invention, and thus can be considered to constitute exemplary modes for its practice. However, those of skill in the art should, in light of the present disclosure, appreciate that many changes can be made in the specific embodiments which are disclosed and still obtain a like or similar result without departing from the spirit and scope of the invention.

Heterophasic Polypropylene Copolymers: HeCo-1 polypropylene (Melt Flow Rate: 4.0 grams per 10 minutes; Density of 0.900 grams per cubic centimeter; Percent Xylenes Soluble (weight percent): 11.5), HeCo-2 polypropylene (Melt Flow Rate: 18 grams per 10 minutes; Density of 0.900 grams per cubic centimeter; Percent Xylenes Soluble (weight percent): 23.2; $M_w/M_n$: 7.01; $M_n$: 3.36E+04; $M_w$: 2.35E+05; $M_z$: 7.61E+05; and $M_{z+1}$: 1.46E+06), HeCo-3 polypropylene (Melt Flow Rate: 100 grams per 10 minutes; Density of 0.900 grams per cubic centimeter; Percent Xylenes Soluble (weight percent): 11.7; $M_w/M_n$: 5.49; $M_n$: 2.99E+04; $M_w$: 1.64E+05; $M_z$: 6.34E+05; and $M_{z+1}$: 1.48E+06), and HeCo-4 polypropylene (Melt Flow Rate: 120 grams per 10 minutes) polypropylene.

Polypropylene Homopolymers: Homo-1 polypropylene (Melt Flow Rate: 2.3 grams per 10 minutes; Density of 0.90 grams per cubic centimeter; $M_w/M_n$: 7.0; $M_n$: 5.8E+04; $M_w$: 4.1E+05; $M_z$: 1.2E+06; and $M_{z+1}$: 2.3+06), Homo-2 polypropylene (Melt Flow Rate: 65 grams per 10 minutes; Density of 0.90 grams per cubic centimeter; $M_w/M_n$: 6.1; $M_n$: 2.9E+04; $M_w$: 1.8E+05; $M_z$: 5.9E+05; and $M_{z+1}$: 1.1E+06), and Homo-3 polypropylene (Melt Flow Rate: 1800 grams per 10 minutes; Density of 0.91 grams per cubic centimeter; $M_w/M_n$: 3.2; $M_n$: 1.56E+04; $M_w$: 5.0E+04; $M_z$: 1.08E+05; and $M_{z+1}$: 1.68E+05).

Elastomeric Ethylene Copolymer: ethylene/octene copolymer (Melt Index: 1.0 grams per 10 minutes; Density of 0.870 grams per cubic centimeter).

Grafted Polyolefin: maleic anhydride grafted polypropylene (Melt Flow Rate: 100 grams per 10 minutes: Density of 0.90 grams per cubic centimeter).

Cellulose-based Biofiller Masterbatch: cellulose-based biofiller masterbatch (fiber content of about 70 weight percent, based on the total weight of the biofiller; about 25 weight percent virgin polypropylene; a specific gravity of 1.27; and a fiber length of about 1 mm).

Additives: Carbon black masterbatch (50% carbon black masterbatch in polyethylene); antioxidant processing stabilizer; Magnesium stearate lubricant; Sodium benzoate nucleating agent; and slip agent.

TABLE 1

| Component*/Test** | Ex. 1 | Ex. 2 | Ex. 3 | Ex. 4 | Ex. 5 |
|---|---|---|---|---|---|
| HeCo-1 polypropylene | 3.25 | | | | |
| HeCo-2 polypropylene | 25.00 | 20.00 | 20.00 | 20.00 | |
| HeCo-3 polypropylene | 35.00 | 30.00 | 10.00 | | |
| HeCo-4 polypropylene | | | | | 15.00 |
| Homo-1 polypropylene | | | | 7.00 | 8.00 |
| Homo-2 polypropylene | | | | 39.40 | 33.40 |
| Homo-3 polypropylene | | 6.25 | 13.65 | | |
| Ethylene/octene copolymer | 15.00 | 13.00 | 15.00 | | 10.00 |
| Maleic anhydride grafted polypropylene | | | | 2.00 | 2.00 |
| Cellulose-based biofiller masterbatch | 21.00 | 30.00 | 40.60 | 30.00 | 30.00 |
| Antioxidant processing stabilizer | 0.20 | 0.20 | 0.20 | 0.20 | 0.20 |
| Sodium benzoate | 0.15 | 0.15 | 0.15 | | |
| Slip agent | 0.40 | 0.40 | 0.40 | | |
| Carbon black masterbatch | | | | 1.00 | 1.00 |
| Magnesium stearate | | | | 0.40 | 0.40 |
| Total | 100.00 | 100.00 | 100.00 | 100.00 | 100.00 |
| Melt Flow Rate (ASTM D1238) - g/10 min | 5.4 | 5.3 | 5.8 | 7.4 | 10.4 |
| Density (ISO 1183) - g/cc | 0.96 | 0.99 | 1.00 | 0.99 | 0.99 |
| Tensile Strength, 50 mm/min (ISO 527) - MPa | 24.1 | 28.6 | 31.6 | 35.0 | 31.8 |
| Elongation-at-Break, 50 mm/min (ISO 527) - % | 18 | 10 | 10 | 4 | 7 |
| Flexural Modulus, 2 mm/min (ISO 178) - MPa | 1,610 | 1,850 | 2,030 | 2,416 | 2,093 |
| Izod Impact at 23 degrees Celsius (ISO 180) - kJ/m² | 10.1 | 6.9 | 7.1 | 2.5 | 3.0 |
| Izod Impact @ −10 degrees Celsius (ISO 180)- kJ/m² | | | | 2.0 | 2.5 |
| Izod Impact @ −30 degrees Celsius (ISO 180)- kJ/m² | 3.7 | 3.2 | 3.3 | | |
| HDT @ 0.45 MPa (ISO 75) - degrees Celsius | 107 | 119 | 129 | 140 | 137 |
| Rockwell Hardness (ASTM D785) - R-Scale | | | | 97 | 90 |

*All weight percentages are based upon the total weight of the final composition.
**The ISO data for Example Nos. 4 and 5 are projected based upon ASTM data.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A terpolymer composition comprising:
(A) a first polymer composition comprising:
(i) a first heterophasic polypropylene copolymer having a melt flow rate in the range of 10-200 grams per 10 minutes; and
(ii) a polypropylene blend comprising:
(a) a first polymer blend comprising:
(1) a second heterophasic polypropylene copolymer having a melt flow rate in the range of 50-200 grams per 10 minutes; and
(2) a third heterophasic polypropylene copolymer having a melt flow rate in the range of 0.5-10 grams per 10 minutes; and
(B) a biofiller composition comprising a cellulose-based biofiller; and
(C) one or more additives selected from the group consisting of carbon black, an antioxidant processing stabilizer, magnesium stearate, sodium benzoate and a slip agent.

2. The filled composition of claim 1, wherein the first heterophasic polypropylene copolymer has a melt flow rate in the range of 10-40 grams per 10 minutes.

3. The terpolymer composition of claim 1, wherein the biofiller composition further comprises an inorganic filler.

4. The terpolymer composition claim 1, further comprising an elastomeric ethylene copolymer composition comprising an elastomeric ethylene copolymer.

5. The terpolvmer composition of claim 1, further comprising a grafted polyolefin composition comprising a polypropylene polymer grafted with an unsaturated monomer.

6. The terpolymer composition of claim 1, wherein the first heterophasic polypropylene copolymer has a melt flow rate in the range of 50-200 grams per 10 minutes.

7. The terpolymer composition of claim 1, having a density as measured by ISO 1183 in the range of 0.920-1.070 grams per cubic centimeter.

8. The terpolymer composition of claim 1, having a flexural modulus, 2 mm/min as measured by ISO 178 in the range of 1300-3000 MPa.

9. The terpolymer composition of claim 1, having an Izod Impact at 23° C. as measured by ISO 180 in the range of 2-20 kJ/m$^2$.

10. The terpolymer filled composition of claim 1 comprising:
(A) from 50 to 95 weight percent of a first polymer composition, relative to the total weight of the terpolymer composition, comprising:
(i) from 5 to 35 weight percent of a first heterophasic polypropylene copolymer, relative to the total weight of the terpolymer composition;
(ii) from 15 to 70 weight percent of a polypropylene blend, relative to the total weight of the terpolymer composition, comprising:
(a) a first polymer blend comprising:
(1) a second heterophasic polypropylene copolymer; and
(2) a third heterophasic polypropylene copolymer; and
(B) from 5 to 50% by weight percent of a biofiller composition, relative to the total weight of the terpolymer composition, comprising a cellulose-based biofiller.

11. The terpolymer composition of claim 10, further comprising 5-20% by weight of an elastomeric ethylene copolymer composition relative to the total weight of the terpolymer composition.

12. The terpolymer composition of claim 10, further comprising 0.5-5% by weight of a grafted polyolefin composition relative to the total weight of the terpolymer composition.

13. The teruolymer composition of claim 10, having a density as measured by ISO 1183 in the range of 0.920-1.070 grams per cubic centimeter.

14. The terpolymer composition of claim 10, having a flexural modulus at 2 mm/min as measured by ISO 178 in the range of 1300-3000 MPa.

15. The terpolymer composition of claim 10, having an Izod Impact at 23° C. as measured by ISO 180 in the range of 2-20kJ/m$^2$.

16. An automotive component comprising the terpolymer composition of claim 1.

17. The terpolymer composition of claim 1, comprising a Rockwell hardness (ASTM D785) of greater than or equal to 90.

* * * * *

UNITED STATES PATENT AND TRADEMARK OFFICE
CERTIFICATE OF CORRECTION

PATENT NO. : 9,708,471 B2
APPLICATION NO. : 14/452040
DATED : July 18, 2017
INVENTOR(S) : Changlai Yang et al.

It is certified that error appears in the above-identified patent and that said Letters Patent is hereby corrected as shown below:

In the Specification

| | | |
|---|---|---|
| Column 6 | Line 6 | Delete "(Mw/Mn)"" and insert --$(M_w/M_n)$"-- |
| Column 8 | Line 8 | After "or", insert --15-- |

In the Claims

| | | |
|---|---|---|
| Column 15 | Line 37 | In Claim 2, delete "filled" and insert --terpolymer-- |
| Column 15 | Line 42 | In Claim 4, after "composition", insert --of-- |
| Column 15 | Line 45 | In Claim 5, delete "terpolvmer" and insert --terpolymer-- |
| Column 16 | Line 36 | In Claim 13, delete "teruolymer" and insert --terpolymer-- |
| Column 16 | Line 44 | In Claim 15, delete "2-20kJ/$m^2$." and insert --2-20 kJ/$m^2$.-- |

Signed and Sealed this
Twenty-fifth Day of February, 2020

Andrei Iancu
*Director of the United States Patent and Trademark Office*